United States Patent
Kitazawa et al.

(10) Patent No.: US 10,023,741 B2
(45) Date of Patent: *Jul. 17, 2018

(54) HEAT-CONDUCTIVE SILICONE COMPOSITION

(71) Applicant: SHIN-ETSU CHEMICAL CO., LTD., Tokyo (JP)

(72) Inventors: Keita Kitazawa, Annaka (JP); Kunihiro Yamada, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/786,676

(22) PCT Filed: May 2, 2014

(86) PCT No.: PCT/JP2014/002397
§ 371 (c)(1),
(2) Date: Oct. 23, 2015

(87) PCT Pub. No.: WO2014/188667
PCT Pub. Date: Nov. 27, 2014

(65) Prior Publication Data
US 2016/0060462 A1     Mar. 3, 2016

(30) Foreign Application Priority Data

May 24, 2013 (JP) ................. 2013-109908
Jul. 16, 2013 (JP) ................. 2013-147582

(51) Int. Cl.
*C08K 3/22* (2006.01)
*C08L 83/04* (2006.01)
*C09K 5/08* (2006.01)
*C08G 77/12* (2006.01)
*C08G 77/20* (2006.01)
*C08K 3/08* (2006.01)

(52) U.S. Cl.
CPC ............... *C08L 83/04* (2013.01); *C09K 5/08* (2013.01); *C08G 77/12* (2013.01); *C08G 77/20* (2013.01); *C08K 2003/0812* (2013.01); *C08K 2003/0893* (2013.01); *C08K 2003/2296* (2013.01); *C08L 2205/02* (2013.01); *C08L 2205/025* (2013.01); *C08L 2205/035* (2013.01)

(58) Field of Classification Search
CPC ............ C08L 83/04; C08K 2003/2296; C08K 2003/0812
See application file for complete search history.

(56) References Cited

U.S. PATENT DOCUMENTS

| | | | |
|---|---|---|---|
| 6,306,957 B1 * | 10/2001 | Nakano | .............. C08L 83/04 524/700 |
| 6,649,258 B2 | 11/2003 | Yamada et al. | |
| 6,818,600 B2 | 11/2004 | Yamada et al. | |
| 7,329,706 B2 | 2/2008 | Fukui et al. | |
| 8,633,276 B2 | 1/2014 | Domae et al. | |
| 2002/0014692 A1 * | 2/2002 | Yamada | .............. C08K 3/08 257/712 |
| 2003/0049466 A1 * | 3/2003 | Yamada | .............. C08K 3/08 428/447 |
| 2003/0127496 A1 * | 7/2003 | Tetsuka | .............. C08L 83/04 228/180.22 |
| 2004/0242762 A1 | 12/2004 | Horikoshi et al. | |
| 2005/0110133 A1 | 5/2005 | Yamada et al. | |
| 2007/0149834 A1 | 6/2007 | Endo et al. | |
| 2008/0213578 A1 | 9/2008 | Endo et al. | |
| 2011/0039738 A1 | 2/2011 | Nakayoshi et al. | |
| 2011/0163460 A1 | 7/2011 | Kato et al. | |
| 2011/0188213 A1 | 8/2011 | Domae et al. | |
| 2012/0119137 A1 * | 5/2012 | Tsuji | .............. C09K 5/14 252/78.3 |
| 2012/0161066 A1 | 6/2012 | Hirabayashi et al. | |

FOREIGN PATENT DOCUMENTS

| | | |
|---|---|---|
| CN | 1626598 A | 6/2005 |
| CN | 102533214 A | 7/2012 |
| CN | 102604386 A | 7/2012 |

(Continued)

OTHER PUBLICATIONS

English language translation 11-246536, dated Dec. 2011.*
Jun. 3, 2014 International Search Report issued in International Patent Application No. PCT/JP2014/002397.
Nov. 24, 2015 International Preliminary Report on Patentability issued in International Patent Application No. PCT/JP2014/002397.
Apr. 8, 2014 International Search Report issued in International Patent Application No. PCT/JP2013/084211.
Apr. 8, 2014 Written Opinion of the International Searching Authority issued in International Patent Application No. PCT/JP2013/084211.

(Continued)

*Primary Examiner* — Margaret G Moore
(74) *Attorney, Agent, or Firm* — Oliff PLC

(57) ABSTRACT

A silicone composition that contains (A) an organopolysiloxane having at least two aliphatic unsaturated hydrocarbon groups per molecule, (B) a filler containing an aluminum powder and a zinc oxide powder, (C) an organohydrogenpolysiloxane having two or more silicon-bonded hydrogen atoms per molecule, and (D) a platinum group metal catalyst, in which a cured product of the silicone composition exhibits a ratio of a storage elastic modulus after 3,600 seconds from the start of measurement to a storage elastic modulus after 7,200 seconds from the start of measurement of 0.7 or less, the storage elastic modulus G' being measured by constructing a program for holding a sample at 150° C. for 7,200 seconds after the sample is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min.

2 Claims, No Drawings

(56) References Cited

FOREIGN PATENT DOCUMENTS

| EP | 0939115 A1 | 9/1999 |
|---|---|---|
| EP | 1 878 767 A1 | 1/2008 |
| JP | S61-157569 A | 7/1986 |
| JP | H08208993 A | 8/1996 |
| JP | 2938428 B1 | 8/1999 |
| JP | 2938429 B1 | 8/1999 |
| JP | 2002-327116 A | 11/2002 |
| JP | 2003-301189 A | 10/2003 |
| JP | 03543663 B2 | 7/2004 |
| JP | 3580366 B2 | 10/2004 |
| JP | 2004-352947 A | 12/2004 |
| JP | 2005154532 A | 6/2005 |
| JP | 2007-214224 A | 8/2007 |
| JP | 3952184 B2 | 8/2007 |
| JP | 2008-038137 A | 2/2008 |
| JP | 04255287 B2 | 4/2009 |
| JP | 2009-286855 A | 12/2009 |
| JP | 2009292928 A | 12/2009 |
| JP | 2010-013521 A | 1/2010 |
| JP | 4572243 B2 | 11/2010 |
| JP | 4656340 B2 | 3/2011 |
| JP | 201188953 A | 5/2011 |
| JP | 11-246536 * | 12/2011 |
| JP | 2011246536 A | 12/2011 |
| JP | 4913874 B2 | 4/2012 |
| JP | 4917380 B2 | 4/2012 |
| JP | 4933094 B2 | 5/2012 |
| JP | 201296361 A | 5/2012 |
| JP | 2012102283 A | 5/2012 |
| JP | 5047505 B2 | 10/2012 |
| JP | 2013-010862 A | 1/2013 |

OTHER PUBLICATIONS

Apr. 16, 2013 International Search Report issued in International Patent Application No. PCT/JP2013/057383.
U.S. Appl. No. 14/396,656, filed Oct. 23, 2014 in the name of Matsumoto.
U.S. Appl. No. 14/759,115, filed Jul. 2, 2015 in the name of Tsuji.
Feb. 24, 2016 Office Action issued in U.S. Appl. No. 14/396,656.
Nov. 3, 2015 Extended European Search Report issued in European Application No. 13780721.0.
Feb. 10, 2015 Office Action issued in Japanese Application No. 2012-098765.
Jan. 12, 2016 Office Action issued in Japanese Patent Application No. 2013-147582.
Jan. 23, 2017 Office Action issued in Chinese Patent Application No. 2014800299045.
May 17, 2017 Office Action issued in Taiwanese Patent Application No. 103116724.
Oct. 10, 2017 Office Action issued in Chinese Patent Application No. 201480029904.5.
Jul. 20, 2017 Office Action cited in Chinese Patent Application No. 201480029904.5.
Aug. 22, 2017 Office Action issued in U.S. Appl. No. 14/914,100.
Jun. 28, 2017 Office Action issued in Chinese Patent Application No. 201480051764.1.
Nov. 15, 2017 Office Action issued in Chinese Patent Application No. 201480051764.1.
Feb. 23, 2018 Office Action issued in Chinese Patent Application No. 201480029904.5.
May 16, 2018 Office Action issued in U.S. Appl. No. 15/820,689.
Apr. 23, 2018 Office Action issued in Chinese Patent Application No. 201480051764.1.

* cited by examiner

HEAT-CONDUCTIVE SILICONE COMPOSITION

TECHNICAL FIELD

The present invention relates to a heat-conductive silicone composition.

BACKGROUND ART

It is widely known that electronic parts such as semiconductor packages generate heat in use, thereby lowering the performance thereof. To solve this problem, various heat dissipating techniques have been used. One typical method is to provide a cooling member such as a heat spreader in the vicinity of a heat-generating part and bring them into close contact to effectively remove heat through the cooling member.

In this case, if there is a space between the heat-generating member and the cooling member, thermal conduction does not proceed smoothly because of the presence of air, which is poor in heat conductivity, and therefore, the temperature of the heat-generating member cannot be sufficiently reduced. To prevent such phenomena, there have been conventionally used, for the purpose of preventing the presence of air, heat-dissipating greases or heat-dissipating sheets that have good heat conductivity and followability to the surface of the member (Patent Literatures 1 to 11).

A thin and compressible heat-dissipating grease is suitable for measures against heat of semiconductor packages in view of heat-dissipating performance. Particularly, it is preferable, in view of reliability, to use a thermosetting heat-dissipating grease that hardly causes outflow of the grease (pumping out) due to the thermal history between heating and cooling of the heat-generating part. On the other hand, since extremely high terminal-density and a reduction in mounting area are required for semiconductor packages in recent years, a manner in which a package is connected to a substrate after a reflow process for fusing solder applied to the bottom of the package at a high temperature of 200° C. or higher, is most often used instead of the conventional manner of connecting a package and a substrate through a lead frame. However, the reflow process of subjecting to high temperature of 200° C. or higher extremely accelerates curing of the thermosetting heat-dissipating grease. Therefore, the heat-dissipating grease cannot be compressed into a prescribed thickness, and the applied heat-dissipating grease cannot sufficiently spread over the whole heat-generating part. Thus, there is a problem of insufficient heat-dissipating performance.

CITATION LIST

Patent Literature

PATENT LITERATURE 1: Japanese Patent No. 2938428
PATENT LITERATURE 2: Japanese Patent No. 2938429
PATENT LITERATURE 3: Japanese Patent No. 3580366
PATENT LITERATURE 4: Japanese Patent No. 3952184
PATENT LITERATURE 5: Japanese Patent No. 4572243
PATENT LITERATURE 6: Japanese Patent No. 4656340
PATENT LITERATURE 7: Japanese Patent No. 4913874
PATENT LITERATURE 8: Japanese Patent No. 4917380
PATENT LITERATURE 9: Japanese Patent No. 4933094
PATENT LITERATURE 10: Japanese Unexamined Patent publication (Kokai) No. 2012-102283
PATENT LITERATURE 11: Japanese Unexamined Patent publication (Kokai) No. 2012-96361

SUMMARY OF INVENTION

Technical Problem

The present invention was accomplished in view of the above-described problems. It is an object of the present invention to provide a silicone composition a cured product of which exhibits a ratio of a storage elastic modulus after 3,600 seconds from the start of measurement to a storage elastic modulus after 7,200 seconds from the start of measurement of 0.7 or less when the storage elastic modulus G' is measured, by means of a viscoelasticity measurement apparatus capable of measuring shear modulus, by constructing a program for holding a sample at 150° C. for 7,200 seconds after the sample is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min.

Solution to Problem

To achieve this object, the present invention provides a silicone composition comprising:
(A) 100 parts by mass of an organopolysiloxane having at least two aliphatic unsaturated hydrocarbon groups per molecule, and having a kinematic viscosity at 25° C. of 60 to 100,000 mm$^2$/s;
(B) 100 to 2,000 parts by mass of a filler containing an aluminum powder and a zinc oxide powder;
(C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5; and
(D) a platinum group metal catalyst in an amount of 0.1 to 500 ppm in terms of platinum with respect to the component (A); wherein
a cured product of the silicone composition exhibits a ratio of a storage elastic modulus after 3,600 seconds from the start of measurement to a storage elastic modulus after 7,200 seconds from the start of measurement of 0.7 or less, the storage elastic modulus G' being measured, by means of a viscoelasticity measurement apparatus capable of measuring shear modulus, by constructing a program for holding a sample at 150° C. for 7,200 seconds after the sample is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min.

When such a silicone composition is employed, the heat-dissipating grease can be compressed into a prescribed thickness even after the reflow process of subjecting to high temperature of 200° C. or higher, and the applied heat-dissipating grease can sufficiently spread over the whole heat-generating part. Therefore, sufficient heat-dissipating performance can be obtained.

In addition, the silicone composition preferably further comprises (E) 1 to 200 parts by mass of a hydrolytic methylpolysiloxane represented by the general formula (1), based on 100 parts by mass of the component (A),

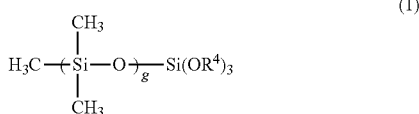
(1)

wherein R⁴ represents an alkyl group having 1 to 6 carbon atoms; and "g" is an integer of 5 to 100.

When such a hydrolytic methylpolysiloxane is contained, sufficient wettability is exhibited, and curing reaction progresses sufficiently, whereby outflow of the grease can be prevented.

The silicone composition preferably further comprises (F) 0.05 to 5.0 parts by mass of one or more retarders selected from the group consisting of acetylene compounds, nitrogen compounds, organophosphorous compounds, oxime compounds, and organochlorine compounds, based on 100 parts by mass of the component (A).

When the component (F) is contained, it functions as a retarder and suppresses progress of the hydrosilylation reaction at room temperature, whereby shelf life or pot life can be extended.

Advantageous Effects of Invention

As described above, the silicone composition of the present invention enables the heat-dissipating grease to be compressed into a prescribed thickness even after the reflow process of subjecting to high temperature of 200° C. or higher, and enables the applied heat-dissipating grease to sufficiently spread over the whole heat-generating part. Therefore, sufficient heat-dissipating performance can be obtained.

DESCRIPTION OF EMBODIMENTS

Hereinafter, the present invention will be described in more detail.

As described above, it has been desired to develop a silicone composition that enables the heat-dissipating grease to be compressed into a prescribed thickness even after the reflow process of subjecting to high temperature of 200° C. or higher, and enables the applied heat-dissipating grease to sufficiently spread over the whole heat-generating part.

The present inventors diligently studied and consequently found that the silicone composition containing the components (A) to (D) and optionally containing the components (E) and (F) can give a cured product that exhibits 0.7 or less of a ratio between a storage elastic modulus after 3,600 seconds from the start of measurement and a storage elastic modulus after 7,200 seconds from the start of measurement when the storage elastic modulus G' is measured, by means of an viscoelasticity measuring apparatus capable of measuring shear modulus, by constructing a program for holding a sample at 150° C. for 7,200 seconds after the sample is heated from 25° C. to 125° C. at a temperature increase rate of 10° C./min, from 125° C. to 145° C. at a temperature increase rate of 2° C./min, and from 145° C. to 155° C. at a temperature increase rate of 0.5° C./min. This silicone composition enables the heat-dissipating grease to be compressed into a prescribed thickness even after the reflow process of subjecting to high temperature of 200° C. or higher, and enables the applied heat-dissipating grease to sufficiently spread over the whole heat-generating part, and thus sufficient heat-dissipating performance can be obtained. From the above findings, they brought the invention to completion.

That is, the present invention is directed to a silicone composition that contains:

(A) 100 parts by mass of an organopolysiloxane having at least two aliphatic unsaturated hydrocarbon groups per molecule, and having a kinematic viscosity at 25° C. of 60 to 100,000 mm²/s;

(B) 100 to 2,000 parts by mass of a filler containing an aluminum powder and a zinc oxide powder;

(C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5; and (D) a platinum group metal catalyst in an amount of 0.1 to 500 ppm in terms of platinum with respect to the component (A); wherein a cured product of the silicone composition exhibits a ratio of a storage elastic modulus after 3,600 seconds from the start of measurement to a storage elastic modulus after 7,200 seconds from the start of measurement of 0.7 or less, the storage elastic modulus G' being measured, by means of a viscoelasticity measurement apparatus capable of measuring shear modulus, by constructing a program for holding a sample at 150° C. for 7,200 seconds after the sample is heated from 25° C. to 125° C. at a temperature increase rate of 10° C./min, from 125° C. to 145° C. at a temperature increase rate of 2° C./rain, and from 145° C. to 150° C. at a temperature increase rate of 0.5° C./min.

Hereinafter, the present invention will be described in detail, but the present invention is not limited thereto.
Component (A)

The component (A) is an organopolysiloxane having at least two aliphatic unsaturated hydrocarbon groups per molecule, and having a kinematic viscosity at 25° C. of 60 to 100,000 mm²/s. The aliphatic unsaturated hydrocarbon group is preferably a monovalent hydrocarbon group containing aliphatic unsaturated bond and having 2 to 8 carbon atoms, more preferably 2 to 6 carbon atoms, and it is much more preferably an alkenyl group. Examples thereof include alkenyl groups such as a vinyl group, an allyl group, a propenyl group, an isopropenyl group, a butenyl group, a hexenyl group, a cyclohexenyl group, and an octenyl group. A vinyl group is particularly preferred. The aliphatic unsaturated hydrocarbon group may be bonded to either silicon atoms in terminals of the molecular chain or silicon atoms within the molecular chain, or may be bonded to both of them.

The organopolysiloxane has a kinematic viscosity at 25° C. of 60 to 100,000 mm²/s, preferably 100 to 30,000 mm²/s. If the kinematic viscosity is less than 60 mm²/s, there is fear that physical properties of the silicone composition are lowered, whereas if it exceeds 100,000 mm²/s, the silicone composition may become poor in spreadability.

In the present invention, kinematic viscosity is a value measured by Ubbelohde-type Oswald viscometer at 25° C. The molecular structure of the organopolysiloxane is not particularly limited so long as it has the above-mentioned properties, and examples thereof include linear structure, branched structure, and linear structure having partially branched or cyclic structure.

Particularly preferable is a linear structure in which the main chain is composed of diorganosiloxane repeating units and both terminals of the molecular chain are blocked with triorganosiloxy groups. Organopolysiloxane having said linear structure may have a partially branched or cyclic structure. The organopolysiloxane may be used solely or in combination of two or more kinds.

An organic group bonded to silicon atoms in the organopolysiloxane other than the aliphatic unsaturated hydrocarbon group is a substituted or unsubstituted monovalent hydrocarbon group having 1 to 18 carbon atoms, preferably 1 to 10 carbon atoms, more preferable 1 to 8 carbon atoms. Examples thereof include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as phenyl group, tolyl group, xylyl group, and naphthyl group; aralkyl groups such as benzyl group, phenethyl group, and phenylpropyl group; and groups in which a part or whole of hydrogen atoms in these groups are substituted with halogen atoms such as fluorine, bromine, and chlorine or cyano groups, such as chloromethyl group, chloropropyl group, bromoethyl group, trifluoropropyl group, and cyanoethyl group. Particularly, methyl group is preferred.

Component (B)

The component (B) is a heat-conductive filler containing an aluminum powder and a zinc oxide powder. In the present invention, the shape of the aluminum powder is not particularly limited, and may be spherical, irregular shape, or other shape. The surface of the aluminum powder may be previously treated. The aluminum powder preferably has an average particle size of 0.1 to 100 µm, more preferably 1 to 40 µm.

If the average particle size of the aluminum powder is 0.1 µm or more, the viscosity of the resulting composition is not too high, and thus, there is no fear that the spreadability thereof becomes poor. If it is 100 µm or less, the resulting composition becomes homogeneous. In the present invention, as the aluminum powder, an aluminum powder having a large average particle size or small average particle size may be used alone, but it is preferred to mixedly used an aluminum powder having a large average particle size (e.g. 5 µm or more and 100 µm or less, preferably 10 µm or more and 100 µm or less, more preferably 10 µm or more and 50 µm or less) and an aluminum powder having a small average particle size (e.g. 0.1 µm or more and 10 µm or less, preferably 0.1 µm or more and 5 µm or less, more preferably 1 µm or more and 5 µm or less).

By mixing these, a grease with good viscosity can be obtained. The mixing ratio may be adjusted according to a desired viscosity of the grease, and it is particularly preferred that the mass ratio of the aluminum powder having a large average particle size to the aluminum powder having a small average particle size range from 0.5 to 9.0, more preferably from 1.0 to 5.0.

In the present invention, the shape of the zinc oxide powder is not particularly limited, and may be spherical, irregular shape, or other shape. The zinc oxide powder preferably has an average particle size of 0.1 to 10 µm, more preferably 1 to 4 µm.

If the average particle size of the zinc oxide powder is 0.1 µm or more, there is no fear that the resulting composition exhibits a high viscosity, and that the spreadability thereof becomes poor. If it is 10 µm or less, the resulting composition becomes homogeneous.

In the present invention, the "average particle size" indicates the particle size of 50% integrated value in the particle size distribution based on volume measured by a laser diffractive-scattering method. The measurement using the laser diffractive-scattering method can be performed, for example, by a Microtrack particle size analyzer MT3300EX, (manufactured by Nikkiso Co., Ltd.).

In the present invention, (B) the filler may further contain, besides the aluminum powder and the zinc oxide powder, a known heat-conductive filler such as titanium oxide powder, alumina powder, boron nitride powder, aluminum nitride powder, diamond powder, gold powder, silver powder, copper powder, carbon powder, nickel powder, indium powder, gallium powder, metallic silicon powder, and silica powder, depending on the purpose.

The amount of (B) the filler is 100 to 2,000 parts by mass, preferably 200 to 1,800 parts by mass, more preferably 400 to 1,800 parts by mass, based on 100 parts by mass of the component (A). If the amount of the filler is less than 100 parts by mass, the resulting composition may become poor in heat conductivity. If the amount exceeds 2,000 parts by mass, the composition may become poor in spreadability.

Component (C)

The component (C) is an organohydrogenpolysiloxane having two or more, preferably three or more, particularly 3 to 100, further preferably 3 to 20 silicon-bonded hydrogen atoms (i.e. SiH groups) per molecule. The organohydrogenpolysiloxane may be any materials so long as the SiH groups in the molecule are subjected to addition reaction with the aliphatic unsaturated hydrocarbon groups contained in the component (A) in the presence of a later-described platinum group metal catalyst to form a crosslinking structure.

The molecular structure of the organohydrogenpolysiloxane is not particularly limited so long as it has the above-mentioned properties, and examples thereof include linear structure, branched structure, cyclic structure, and linear structure having partially branched or cyclic structure. Particularly preferable is linear or cyclic structure. The organohydrogenpolysiloxane preferably has a kinematic viscosity at 25° C. of 1.0 to 1,000 mm$^2$/s, more preferably 10 to 100 mm$^2$/s.

If the kinematic viscosity is 1.0 mm$^2$/s or more, there is no fear that physical properties of the silicone composition are lowered. If it is 1,000 mm$^2$/s or less, there is no fear that the spreadability of the silicone composition becomes poor. In the present invention, the kinematic viscosity is a value measured by Ubbelohde-type Oswald viscometer at 25° C.

As the organic group bonded to silicon atoms in the organohydrogenpolysiloxane, there may be mentioned a monovalent hydrocarbon group other than an aliphatic unsaturated hydrocarbon group, in particular, an unsubstituted or substituted monovalent hydrocarbon group having 1 to 12 carbon atoms, preferably 1 to 10 carbon atoms. Examples thereof include alkyl groups such as methyl group, ethyl group, propyl group, butyl group, hexyl group, and dodecyl group; aryl groups such as phenyl group; aralkyl groups such as 2-phenethyl group and 2-phenylpropyl group; groups in which a part or whole of hydrogen atoms in these groups are substituted with halogen atoms such as fluorine, bromine, and chlorine or cyano groups, such as chloromethyl group, chloropropyl group, bromoethyl group, trifluoropropyl group, and cyanoethyl group; and epoxy ring-containing organic groups (alkyl groups substituted with glycidyl group or glycidyloxy group) such as 2-glycidoxyethyl group, 3-glycidoxypropyl group, and 4-glycidoxybutyl group. The organohydrogenpolysiloxane may be used solely or in combination of two or more kinds.

The amount of (C) the organohydrogenpolysiloxane is such an amount that the ratio of a number of the SiH groups in the component (C) to a total number of the aliphatic unsaturated hydrocarbon groups in the component (A) is in the range of 0.5 to 1.5. If the amount of the component (C) is less than 0.5, there is fear that the curing reaction does not proceed sufficiently, and thus outflow of the grease occurs. If it exceeds 1.5, unreacted SiH groups cause excess cross-linking reaction, so that it becomes difficult to compress the heat-dissipating grease into a prescribed thickness after the reflow process and to sufficiently spread the applied heat-dissipating grease over the whole heat-generating part, which may result in insufficient heat-dissipating performance.

Component (D)

The component (D) is a platinum group metal catalyst, which serves to accelerate the addition reaction mentioned above. As the platinum group metal catalyst, conventionally known materials used for addition reaction can be used. Examples thereof include platinum-based, palladium-based, and rhodium-based catalyst. Among them, platinum and a platinum compound are preferred because of relatively high availability thereof. For example, simple platinum, platinum black, chloroplatinic acid, platinum-olefin complexes, platinum-alcohol complexes, and platinum coordination compounds may be mentioned. The platinum-based catalyst may be used solely or in combination of two or more kinds.

The amount of the component (D) is 0.1 to 500 ppm, preferably 1.0 to 100 ppm in terms of platinum group metal atoms relative to the component (A) on the basis of mass. If the amount of the catalyst is less than 0.1 ppm, no catalytic effect is expected. If it exceeds 500 ppm, the catalytic effect does not increase, resulting in poor economy, so that it is not preferable.

Component (E)

The silicone composition of the present invention may further contain a hydrolytic methylpolysiloxane represented by the formula (1).

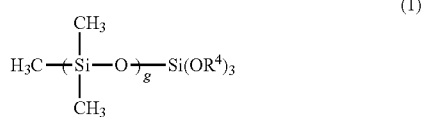

In the formula (1), $R^4$ represents an alkyl group having 1 to 6 carbon atoms; and examples thereof include methyl group, ethyl group, propyl group, isopropyl group, butyl group, sec-butyl group, tert-butyl group, pentyl group, and hexyl group. "g" is an integer of 5 to 100, preferably 10 to 60. If the value of "g" is 5 or more, there is no fear that oil-bleeding from the silicone composition becomes prominent and reliability is lowered, so that it is preferable. If the value of "g" is 100 or less, there is no fear that the wettability to the filler becomes insufficient, so that it is preferable.

The amount of the component (E) is 1 to 200 parts by mass, preferably 10 to 180 parts by mass, more preferably 20 to 150 parts by mass, based on 100 parts by mass of the component (A). If the amount of the component (E) is 1 part by mass or more, sufficient wettability can be expressed. If the amount of the component (E) is 200 parts by mass or less, curing reaction proceeds sufficiently, so that outflow of the grease does not occur. Therefore, it is preferable.

Component (F)

The silicone composition of the present invention may further contain component (F), a retarder. The retarder serves to suppress the progress of the hydrosilylation reaction at room temperature, and is used for extending shelf life or pot life. As the retarder, a conventionally known retarder used for an addition-curable silicone composition can be used. Examples thereof include acetylene compounds such as acetylene alcohols (e.g., 1-ethynyl-1-cyclohexanol and 3,5-dimethyl-1-hexyn-3-ol); various nitrogen compounds such as tributylamine, tetramethylethylenediamine, and benzotriazol; organophosphorus compounds such as triphenylphosphine; oxime compounds; and organochlorine compounds.

The amount of the component (F) is 0.05 to 5.0 parts by mass, preferably 0.1 to 1.0 part by mass, based on 100 parts by mass of the component (A). If the amount of the retarder is 0.05 part by mass or more, a desired sufficient shelf life or pot life can be obtained. If it is 5.0 parts by mass or less, there is no fear that curability of the silicone composition is lowered, so that it is preferable.

The retarder may be diluted with toluene or the like to enhance dispersibility to the silicone composition. Moreover, the silicone composition of the present invention may contain unreactive organo(poly)siloxane such as methylpolysiloxane to adjust elasticity and viscosity of the composition.

In addition, to prevent deterioration of the silicone composition, a conventionally known antioxidant such as 2,6-di-t-butyl-4-methylphenol may be added, if necessary. Further, a dye, a pigment, a flame retardant, a precipitation-inhibitor, a thixotropy-enhancer, or other additives may be blended, if necessary.

A method for producing the silicone composition of the present invention may follow the conventional method for producing a silicone grease composition, and is not particularly limited. For example, the composition can be produced by mixing the components (A) to (F) and any other optional components with a mixer such as a Trimix, Twinmix or Planteary Mixer (all registered trademarks for mixers manufactured by Inoue Manufacturing Co., Ltd.), an Ultramixer (a registered trademark for a mixer manufactured by Mizuho Industrial Co., Ltd.), and a Hivis Disper Mix (a registered trademark for a mixer manufactured by PRIMIX Corporation).

The silicone composition of the present invention preferably has a viscosity measured at 25° C. of 3.0 to 300 Pa·s, more preferably 5.0 to 200 Pa·s. The viscosity of 3.0 Pa·s or more is preferable because there is no fear that the workability is lowered. The above viscosity can be achieved by adjusting the composition of the respective components. In the present invention, the viscosity is a value measured at 25° C. by a Malcolm viscometer (at 10 rpm with Rotor-A, and at a shear rate of 6[1/s]).

The silicone composition of the present invention can be suitably used, as well as the conventional heat-conductive silicone grease, for dissipating heat by placing the composition between a cooling member and a heat-generating member such as electronic parts of a semiconductor package to conduct heat from the heat-generating member to the cooling member. In particular, it is effective to the mounting form requiring the reflow process for fusing solder applied to the bottom of the package at a high temperature of 200° C. or higher. The curing conditions when the silicone composition of the present invention is thermally cured are not particularly limited, but generally 80° C. to 200° C., preferably 100 to 180° C., for 30 minutes to 4 hours, preferably 30 minutes to 2 hours.

EXAMPLES

Hereinafter, the present invention will be more specifically described with reference to examples and comparative examples, but the present invention is not limited to the following examples. Tests relating to the effects of the present invention were performed in the manner described below.

[Storage Elastic Modulus]

The silicone composition was applied between two parallel plates each having a diameter of 2.5 cm so as to give a thickness of 2 mm. Then, a program was constructed for heating the coated plates from 25° C. to 125° C. at a temperature increase rate of 10° C./min, from 125° C. to 145° C. at a temperature increase rate of 2° C./min, and from 145° C. to 150° C. at a temperature increase rate of 0.5° C./min and then holding them at 150° C. for 7,200 seconds; and storage elastic modulus after 3,600 seconds and 7,200 seconds from the start of holding at 150° C. were measured. The measurement was performed using a viscoelasticity measurement apparatus (Type: RDAIII, manufactured by Rheometric Scientific Ltd.).

[Viscosity]

The absolute viscosity of the silicone composition was measured by a Malcolm viscometer (type: PC-1T) at 25° C.

[Heat Conductivity]

The silicone composition was wrapped with kitchen wrap and measured by TPA-501 manufactured by Kyoto electronics manufacturing Co., Ltd.

[Crushability Test]

5 mg of the silicone composition was applied onto a silicon wafer (10 mm×10 mm), and heated at 240° C. for 2 minutes. Thereafter, the wafer was cooled to room temperature, and a silicon wafer with the same size was placed thereon to prepare a test sample pressurized at 1.8 kgf for 5 seconds. Then, the thickness of the silicone composition was measured.

[Spreadability Test]

The test sample used in the crushability test was separated into two silicon wafers, and (area covered with the silicone composition)/(area of the silicon wafer) was calculated.

The respective components used in examples and comparative examples are shown below. In the following, the kinematic viscosity is a value measured by Ubbelohde-type Oswald viscometer (manufactured by Sibata scientific technology Ltd.) at 25° C.

Component (A)

A-1: dimethylpolysiloxane having a kinematic viscosity at 25° C. of 600 mm²/s in which both terminals are blocked with dimethylvinylsilyl groups.

A-2: dimethylpolysiloxane having a kinematic viscosity at 25° C. of 600 mm²/s in which both terminals are blocked with trimethylsilyl groups and two of methyl groups bonded to silicon atoms within the molecular chain are vinyl groups.

Component (B)

B-1: an aluminum powder having an average particle size of 20.0 μm (heat conductivity: 237 W/m·° C.)

B-1: an aluminum powder having an average particle size of 2.0 μm (heat conductivity: 237 W/m·° C.)

B-3: a zinc oxide powder having an average particle size of 1.0 μm (heat conductivity: 25 W/m·° C.)

Component (C)

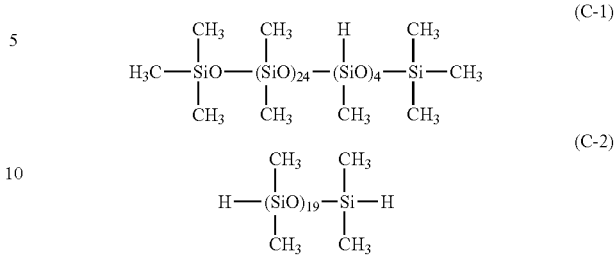

Component (D)

D-1: a solution in which a platinum-divinyltetramethyldisiloxane complex was dissolved in the same dimethylpolysiloxane as A-1 (platinum atom content: 1% by mass).

Component (E)

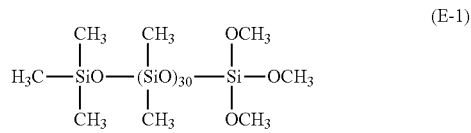

Component (F)

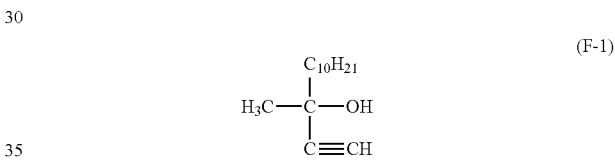

Examples 1 to 13 and Comparative examples 1 to 7

The components (A) to (F) were mixed as described below to obtain compositions of Examples 1 to 13 and Comparative examples 1 to 7.

That is, the components (A), (B), and (E) were placed into a 5-L Planteary Mixer (manufactured by Inoue Manufacturing Co., Ltd.) with the blending ratio shown in Tables 1 and 2, and mixed for 1 hour at room temperature. Then, the components (C), (D), and (F) were added thereto, and mixed homogeneously. The measurement results of storage elastic modulus, viscosity, and heat conductivity and results of the crushability test and the spreadability test of the obtained composition were shown in Tables 1 and 2.

Examples 1 to 13

TABLE 1

| | | 1 | 2 | 3 | 4 | 5 | 6 | 7 |
|---|---|---|---|---|---|---|---|---|
| Composition (parts by mass) | A-1 | 100 | | 100 | 100 | 100 | 100 | 100 |
| | A-2 | | 100 | | | | | |
| | B-1 | 490 | 490 | 654 | 368 | 490 | 490 | 490 |
| | B-2 | 324 | 324 | 432 | 244 | 324 | 324 | 324 |
| | B-3 | 100 | 100 | 134 | 76 | 100 | 100 | 100 |
| | Total amount of filler | 914 | 914 | 1220 | 688 | 914 | 914 | 914 |
| | C-1 | 7.9 | 7.7 | 7.9 | 7.9 | 3.2 | 9.5 | 11.9 |
| | C-2 | | | | | 6.9 | | |

TABLE 1-continued

|  |  |  |  |  |  |  |  |  |
|---|---|---|---|---|---|---|---|---|
|  | D-1 | 0.06 | 0.06 | 0.06 | 0.06 | 0.06 | 0.06 | 0.06 |
|  | E-1 | 100 | 100 | 100 | 100 | 100 | 100 | 100 |
|  | F-1 | 0.4 | 0.4 | 0.4 | 0.4 | 0.4 | 0.4 | 0.4 |
|  | SiH/SiVi (number ratio) | 1.0 | 1.0 | 1.0 | 1.0 | 1.0 | 1.2 | 1.5 |
|  | Storage elastic modulus (after 3,600 sec) | 14650 | 9310 | 19690 | 10920 | 14950 | 53060 | 180080 |
|  | Storage elastic modulus (after 7,200 sec) | 55560 | 46320 | 70440 | 32500 | 28810 | 183110 | 486640 |
|  | after 3,600 sec/ after 7,200 sec | 0.26 | 0.20 | 0.28 | 0.34 | 0.52 | 0.29 | 0.37 |
|  | Viscosity (Pa · S) | 9.5 | 9.1 | 24 | 5.2 | 9.3 | 9.1 | 8.8 |
|  | Heat conductivity (W/m · ° C.) | 2.1 | 2.0 | 2.7 | 1.2 | 2.1 | 2.0 | 1.9 |
| Evaluation result | Thickness of silicone composition after crushability test (μm) | 34 | 36 | 48 | 34 | 46 | 39 | 43 |
|  | Result of spreadability test (area covered with silicone composition/area of silicon wafer) | 0.88 | 0.87 | 0.66 | 0.91 | 0.71 | 0.80 | 0.72 |

|  |  |  | 8 | 9 | 10 | 11 | 12 | 13 |
|---|---|---|---|---|---|---|---|---|
| Composition (parts by mass) | A-1 |  | 100 | 100 | 100 | 100 | 100 | 100 |
|  | A-2 |  |  |  |  |  |  |  |
|  | B-1 |  | 490 | 490 | 490 | 490 | 490 | 490 |
|  | B-2 |  | 324 | 324 | 324 | 324 | 324 | 324 |
|  | B-3 |  | 100 | 100 | 100 | 100 | 100 | 100 |
|  | Total amount of filler |  | 914 | 914 | 914 | 914 | 914 | 914 |
|  | C-1 |  | 7.9 | 7.9 | 7.9 | 7.9 | 5.5 | 4.0 |
|  | C-2 |  |  |  |  |  |  |  |
|  | D-1 |  | 0.09 | 0.06 | 0.06 | 0.06 | 0.06 | 0.06 |
|  | E-1 |  | 100 | 100 | 150 | 50 | 100 | 100 |
|  | F-1 |  | 0.4 | 0.6 | 0.4 | 0.4 | 0.4 | 0.4 |
|  | SiH/SiVi (number ratio) |  | 1.0 | 1.0 | 1.0 | 1.0 | 0.7 | 0.5 |
|  | Storage elastic modulus (after 3,600 sec) |  | 60780 | 3360 | 2110 | 125700 | 7390 | 2950 |
|  | Storage elastic modulus (after 7,200 sec) |  | 93320 | 7700 | 13940 | 220480 | 13640 | 4480 |
|  | after 3,600 sec/ after 7,200 sec |  | 0.65 | 0.44 | 0.15 | 0.57 | 0.54 | 0.66 |
|  | Viscosity (Pa · S) |  | 9.4 | 9.6 | 5.8 | 45 | 9.7 | 9.8 |
|  | Heat conductivity (W/m · ° C.) |  | 2.0 | 2.0 | 1.6 | 2.6 | 2.0 | 2.1 |
| Evaluation result | Thickness of silicone composition after crushability test (μm) |  | 47 | 33 | 30 | 44 | 35 | 34 |
|  | Result of spreadability test (area covered with silicone composition/area of silicon wafer) |  | 0.67 | 0.94 | 0.97 | 0.69 | 0.86 | 0.91 |

Comparative Examples 1 to 7

TABLE 2

|  |  | 1 | 2 | 3 | 4 | 5 | 6 | 7 |
|---|---|---|---|---|---|---|---|---|
| Composition (parts by mass) | A-1 | 100 | 100 | 100 | 100 | 100 | 100 | 100 |
|  | A-2 |  |  |  |  |  |  |  |
|  | B-1 | 1180 | 490 | 490 | 490 | 490 | 490 | 490 |
|  | B-2 | 778 | 324 | 324 | 324 | 324 | 324 | 324 |
|  | B-3 | 240 | 100 | 100 | 100 | 100 | 100 | 100 |
|  | Total amount of filler | 2198 | 914 | 914 | 914 | 914 | 914 | 914 |
|  | C-1 | 7.9 | 3.2 |  | 59 | 7.9 | 16 | 20 |
|  | C-2 |  |  | 4.6 |  |  |  |  |
|  | D-1 | 0.06 | 0.06 | 0.06 | 0.06 | 10 | 0.06 | 0.06 |
|  | E-1 | 100 | 100 | 100 | 100 | 100 | 100 | 100 |
|  | F-1 | 0.4 | 0.4 | 0.4 | 0.4 | 0.4 | 0.4 | 0.4 |
|  | SiH/SiVi (number ratio) | 1.0 | 0.4 | 0.4 | 7.5 | 1.0 | 2.0 | 2.5 |
|  | Storage elastic modulus (after 3,600 sec) | Not becoming grease form | Not cured | Not cured | 521000 | 75960 | 249530 | 388160 |
|  | Storage elastic modulus (after 7,200 sec) |  |  |  | 659240 | 88030 | 318770 | 482700 |
|  | after 3,600 sec/ after 7,200 sec |  |  |  | 0.79 | 0.86 | 0.78 | 0.80 |
|  | Viscosity (Pa·S) |  |  |  | 6.5 | 9.7 | 8.4 | 8.2 |
|  | Heat conductivity (W/m·°C.) |  |  |  | 1.5 | 2.1 | 1.9 | 1.8 |
| Evaluation result | Thickness of silicone composition after crushability test (μm) |  |  |  | 87 | 93 | 77 | 81 |
|  | Result of spreadability test (area covered with silicone composition/area of silicon wafer) |  |  |  | 0.36 | 0.35 | 0.42 | 0.37 |

From the results of Tables 1 and 2, Examples 1 to 13 satisfying the requirements of the present invention show smaller thicknesses of the silicone composition after the crushability test and larger resulting values of the spreadability test, compared with Comparative examples 1 to 7. Accordingly, it could be confirmed that the silicone composition of the present invention enables the heat-dissipating grease to be compressed into a prescribed thickness even after the reflow process of subjecting to high temperature of 200° C. or higher, and enables the applied heat-dissipating grease to sufficiently spread over the whole heat-generating part.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A silicone composition comprising:
(A) 100 parts by mass of an organopolysiloxane having at least two aliphatic unsaturated hydrocarbon groups per molecule, and having a kinematic viscosity at 25° C. of 60 to 100,000 mm²/s;
(B) 100 to 2,000 parts by mass of a filler containing an aluminum powder and a zinc oxide powder;
(C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5;
(D) a platinum group metal catalyst in an amount of 0.1 to 9 ppm in terms of platinum with respect to the component (A); and
(F) 0.05 to 0.4 parts by mass of one or more retarders selected from the group consisting of acetylene compounds, nitrogen compounds, organophosphorous compounds, oxime compounds, and organochlorine compounds, based on 100 parts by mass of the component (A); wherein
a cured product of the silicone composition exhibits a ratio of a storage elastic modulus after 3,600 seconds from the start of measurement to a storage elastic modulus after 7,200 seconds from the start of measurement of 0.7 or less, the storage elastic modulus G' being measured, by means of a viscoelasticity measurement apparatus capable of measuring shear modulus, by constructing a program for holding a sample at 150° C. for 7,200 seconds after the sample is heated from 25° C. to 125° C. at a temperature increase rate of 10°

C./min, from 125° C. to 145° C. at a temperature increase rate of 2° C./min, and from 145° C. to 150° C. at a temperature increase rate of 0.5° C./min.

2. The silicone composition according to claim 1, further comprising
(E) 1 to 200 parts by mass of a hydrolytic methylpolysiloxane represented by the general formula (1), based on 100 parts by mass of the component (A),

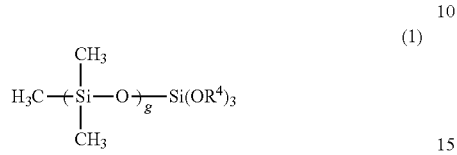

(1)

wherein $R^4$ represents an alkyl group having 1 to 6 carbon atoms; and "g" is an integer of 5 to 100.

* * * * *